United States Patent [19]
Morris et al.

[11] Patent Number: 5,349,678
[45] Date of Patent: Sep. 20, 1994

[54] VERSATILE RF DATA CAPTURE SYSTEM

[75] Inventors: Michael D. Morris; Lyle L. Zumbach, both of Cedar Rapids, Iowa

[73] Assignee: Norand Corporation, Cedar Rapids, Iowa

[21] Appl. No.: 748,150

[22] Filed: Aug. 21, 1991

[51] Int. Cl.$^5$ .............................. G06F 15/21
[52] U.S. Cl. ........................... 395/800; 364/DIG. 2; 364/920; 364/927; 364/919.2
[58] Field of Search ............... 395/325, 600, 800; 364/DIG. 2 MS File

[56]  References Cited

U.S. PATENT DOCUMENTS

| | | | |
|---|---|---|---|
| 3,942,157 | 3/1976 | Azure | 364/DIG. 2 |
| 4,125,871 | 11/1978 | Martin | 364/DIG. 1 |
| 4,277,837 | 7/1981 | Stuckert | 364/DIG. 2 |
| 4,839,854 | 6/1989 | Sakami et al. | 364/DIG. 2 |
| 4,905,186 | 2/1990 | Fukui | 364/DIG. 2 |
| 4,910,794 | 3/1990 | Mahany . | |
| 4,924,462 | 5/1990 | Sojka . | |
| 4,940,974 | 7/1990 | Sojka . | |

*Primary Examiner*—Thomas M. Heckler
*Attorney, Agent, or Firm*—McAndrews, Held & Malloy, Ltd.

[57] ABSTRACT

A data capture system is disclosed as comprising a plurality of client data collection terminals, and a server station. Each terminal including a mechanism for collecting data, a dynamic addressable memory and a first controller operating on data formatted in a first style. The server station comprises mass memory, which is larger than the dynamic addressable memory of a terminal for storing data to be used by the data collection terminals, an addresser responsive to a memory altering request for addressing the mass memory and a second controller operating on data formatted in a second style different from said first style. The data stored in the dynamic addressable memory is formatted in the second style. A communication system interconnects the server station and each of the plurality of client data collection terminals. The first controller of each client data collection terminal is responsive to a need for further data to generate a memory altering request and for actuating the communication system to transmit the generated request to the server station. The request is generated to identify its terminal and the particular needed data. The second controller of the server station is responsive to the transmitted request to address and retrieve the needed data from the mass memory before actuating the communication system to transmit the needed data back to the requesting terminal as identified by the request.

27 Claims, 9 Drawing Sheets

VERSATILE RF DATA CAPTURE SYSTEM

AUTHORIZATION PURSUANT TO 37 CFR 1.71(d) AND (e)

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

REFERENCE TO RELATED, CO-PENDING PATENT APPLICATIONS

The following, co-pending applications are all assigned to assignee of this invention and are incorporated herein by reference:

1. U.S. Ser. No. 700704 (Express Mail Label No.: FB 537 394 682US), entitled "SYSTEM FOR COUPLING A MULTIPLICITY OF RF DATA COLLECTION TERMINALS WITH HOST COMPUTER MEANS" filed on May 14, 1991 in the names of Gollnick et al. now abandoned in favor of U.S. Ser. No. 07/857,603, filed Mar. 30, 1992, now abandoned in favor of U.S. Ser. No. 07/947,102, filed Sep. 14, 1992 and
2. U.S. Ser. No. 660618 (Express Mail mailing Label No.: FB 537 394 671US), entitled "SYSTEM FOR PROCESSING COMMUNICATIONS WITH MULTIPLE PORTABLE RF DATA COLLECTION TERMINALS", filed Feb. 25, 1991 in the name of P. Miller, now abandoned in favor of U.S. Ser. No. 07/830,561, filed Jan. 30, 1992.

BACKGROUND OF THE INVENTION

The present invention relates to a data capture system 10 illustrated in FIG. 1 for entering data at a plurality of remote locations using means such as a plurality of portable data collection terminals 12a, b-n. The data capture system 10 is applicable to receive and collect a wide variety of data and has found particular application in warehouses or retail store where a data capture system 10 would be used to keep an up-to-date record of the products to be marketed. Typically, the system 10 would be capable of updating on a real time basis the inventory count of products, and to use stock locator data to identify where each product of the remaining inventory is stored, when a product is moved from one place to another, and which employee has current charge of that product. In addition, when a product is sold, the price and sales person who sold the product are recorded.

Such data may be inputted into a terminal 12 by means of its keyboard 13. For example, a terminal user could count the number of one type of product and enter that number via the terminal's keyboard 13. Alternatively, data could be entered to the terminal 10 via a CCD bar code scanner 22, which is electrically coupled by a cable 20 to its terminal 12. In an illustrative embodiment of this invention, the scanner as illustratively identified in FIG. 1 by the numeral 22a and its terminal 12a could take the form of that modular scanner/terminal described in PCT international application WO90/16033 published Dec. 27, 1990. Differing types of scanners 22b and 22n could also be used with the terminals 12 and may illustratively take the form of those scanners described in U.S. Pat. Nos. 4,970,379 of Danstrom, 4,882,476 of White, 4,894,523 of Chadima, 4,877,949 of Danielson et al., 5,019,669 of Adams et al. and 4,924,462 of Sojka; International Application No. PCT/US90/03282 of Koenck et al.; and European Patent Publication No. 0 353 759 of Mahany et al.

The data capture system 10 utilizes illustratively RF transmission to bilaterally transmit data between each of the plurality of terminals 12a, b-n and a base radio transceiver 14. By way of example, the base radio transceiver may illustratively take the form of that model RB3000 base radio transceiver manufactured by Norand Corporation, Cedar Rapids of Iowa. In turn, the base radio transceiver 14 is connected via a communications multiplexer 16a or a communications controller 16b to a host computer 18. Illustratively, the multiplexer 16a could take the form of that model RM3200 as manufactured by Norand Corporation and the controller 16b could take the form of that controller identified as model RC2250 of Norand Corporation. The host computer 18 may illustratively be an International Business Machines Corporation of AT class or higher. As illustrated in FIG. 1, the host computer 18 includes a keyboard 28, a display 24 and a system unit 26.

Each of the portable data collection terminals 12a, b-n includes a transceiver (not shown in FIG. 1) for transmitting RF messages to and from the base radio transceiver 14. A transmitted message comprises an initialization sequence, an address indicative of the particular terminal 12a, b-or n from or to which the message is directed, a message identifier and system information, the message data and/or control commands, error control, and an end of message indication. U.S. Pat. Nos. 4,910,794; 4,924,462; and 4,940,974, each assigned to the assignee of this invention and incorporated herein by reference, provide further information on RF data collection terminals and systems.

In a RF data capture system similar to that shown in FIG. 1 known as the RT1200 system of Norand Corporation, controlled RF transmission between a plurality of terminals and a radio base is established using a communications multiplexer similar to that of the multiplexer 16a shown in FIG. 1 to provide access to a particular one of the terminals 12a,b-n. The RT1200 system utilizes time division multiplexing on a single frequency channel. The RT1200 communications protocol is based on a sequential polling method that transmits a query addressed to each portable terminal in succession, and allows a specified amount of time for the addressed terminal to respond when the addressed terminal has a data message ready for transmission. U.S. Pat. No. 4,940,974 describes an improved, adaptive data communications system wherein the base radio transceiver 14 transmits a multi-terminal polling signal to each of its terminals 12a, b-n. That multi-terminal polling signal defines a series of successive response time slots in which the terminals 12 may randomly select to respond. A terminal 12 having a message to be transmitted to the host computer 18 via the base radio transceiver 14 transmits a brief response burst in the selected time slot giving its own unique identification address. After receiving the responses from the ready terminals 12, the base radio transceiver 14 polls each of the responding terminals 12, ignoring those terminals without messages to be transmitted. This system is adaptive in that the number of time slots may be changed depending upon the number of active terminals ready to transmit data messages.

The present invention is particularly related to adapting such data capture system 10 as shown in FIG. 1 to employ distributed processing concepts. Each of the portable data collection terminals 12 has a computer processing capability in the illustrative form of a microprocessor, whereby the entire system's processing capability may be distributed between the host computer 18 and the portable terminals 12. The system 10 is structured in accordance with a client/server architecture whereby the host computer 18 acts as a server to each of the plurality of client terminals 12, whereby programs may be dynamically loaded across that RF (or any serial) data link established between the host computer 18 and its terminals 12.

The use of distributed processing is enhanced by relational database technology and the use of Structured Query Language (SQL) developed by the International Business Machines Company to provide access to relational databases. The use of relational database technology depends on organizing data in tables (or relations); each row of the table represents a record and each column represents an attribute. Various operations may be performed on these relations and, since the mathematics of these operations is very well understood, the results are predictable. An example of these operations is the "join" where two or more relations may be put together based on some common attribute. The advantage of this organization is that data may be easily retrieved in a form not envisioned by the designers; that is, ad hoc retrievals are quite easy to perform.

A further concept of distributed processing is to partition the system so that data is available to all network users but the data physically resides where it is most likely to be processed. This provides universal access without incurring severe communication overhead penalties. In the context of the data capture system 10 illustrated in FIG. 1, data is made available to each of the terminals 12 and to the host computer 18 by the use of the RF transmission between each of terminals 12 and the base radio transceiver 14. However, employing the concept of distributed processing would direct that more data and application programs be stored within each of the terminals 12, where such data is used or such programs executed. As a result, overhead penalties, primarily in terms of delays as would occur by the transmission of data between the terminals 12 and its host computer 18 are avoided.

In a client/server model, the server provides a general function to several client processes. Some of the more useful implementations of this concept are distributed databases, remote procedure calls and networked pipes. The distributed databases currently rely on some form of communication through Structured Query Language (SQL). These databases are comprised of front-end applications and a database server. The application interacts with the user. When database access is required, the application sends an SQL request to the database server which services the request across a network. This allows most of the processing to be done locally, but provides for a central data store that may be shared by many distributed users.

The remote procedure call concept allows systems to become specialized servers so that many applications may use their specialized hardware. To access these remote services, the application program makes a procedure call that is like any procedure call to the program's code. The difference is that the call results in a request to a remote system to provide the computation designated by the call.

The concept of "pipes" relates to supplying the output of one process to the input of another process. If the two processes are on different computers then this becomes a method of distributed processing. A variant of this method is the named pipe which allows select output to be input to another process over a named connection. This is the primary method of distributed interprocess communications with an OS/2 LAN Manager.

The efficient transmission of data to a remote terminal of a system is key to distributed processing. IBM's solution is their Distributed Data Management (DDM) protocols. These are a set of published IBM protocols that describe how to access files and databases on a remote system. IBM also developed a System Application Architecture (SAA) with common programming interfaces for program access to remote data on IBM SAA compliant systems. The importance of these protocols (which use LU 6.2 protocols for inter-system communication) is that a remote system such as a PC may access IBM host databases and files without having to program the host computer.

Remote data access in the non-IBM world is also becoming standard. The Network File System (NFS TM) protocols (developed by Sun Microsystems but placed in the public domain) may be used to access or create files on any system running an NFS server. Novell Corporation is also providing similar services to a wide range of systems with its portable Netware TM.

In current data capture systems employing a plurality of remote terminals 12, the application program is run in the centrally disposed host computer 18 for real time control of the remote terminals 12. Placing control in the host computer 18 increases significantly the hardware and software complexity forcing the host computer 18 to run multiple processes. Such application programs residing in the host computer 18 are complicated by the need to assure the concurrent control over shared data. Further, the host computer 18 must be fast enough to service all remote terminals 12 in real time. In such current data capture systems, the host computer 18 must normally validate data entry by the user and must respond to all user input, thus requiring significant amounts of data to be sent back and forth over an RF link between each of the terminals 10 and its host computer 18 as well as increasing the number of data transition session between the host computer 18 and its terminals 12.

The present invention is related to the use of distributed processing concepts in a RF data capture system 10 as generally shown in FIG. 1 and, in particular, to improve the efficiency of such overall systems by improving the speed and efficiency of data transmission over the RF link between each of the terminals 12a,b-n and the base radio transceiver 14.

SUMMARY OF THE INVENTION

It is therefore an object of this invention to decrease the response time required for a portable data collection terminal to respond to its user.

It is a further object of this invention to minimize the data transmitted typically by RF transmission between each of a plurality of terminals and its centrally disposed host computer.

It is a still further object of this invention to eliminate programming the host computer for real time control of its plurality of data collection terminals.

It is another object of this invention to provide an environment for the ready development of application programs for each of a plurality of data collection terminals.

It is a still further object of this invention to provide a new and improved scheme of distributive processing between a central or host computer and a plurality of remote terminals.

It still a further object of this invention to provide a new and improved battery operated terminal for use in a data capture system comprised of a plurality of such terminals, wherein the drain imposed by large memory and frequent use of radio modules is minimized.

In accordance with these and other objects of the invention, a data capture system comprises a plurality of client data collection terminals, and a server station. Each terminal includes a mechanism for collecting data, a dynamic addressable memory and a first controller operating on data formatted in a first style. The server station comprises a mass memory, which is larger than the dynamic addressable memory of a terminal for storing data to be used by the data collection terminals, an addresser responsive to a memory altering request for addressing the mass memory and a second controller operating on data formatted in a second style different from the first style. The data stored in the dynamic addressable memory is formatted in the second style. A communication system interconnects the server station and each of the plurality of client data collection terminals. The first controller of each client data collection terminal is responsive to a need for further data to generate a memory altering request and for actuating the communication system to transmit the generated request to the server station. The request is generated to identify its terminal and the particular needed data. The second controller of the server station is responsive to the transmitted request to address and retrieve the needed data from the mass memory before actuating the communication system to transmit the needed data back to the requesting terminal as identified by the request.

In a further aspect of this invention, each of the plurality application programs is partitioned into a root module and at least one overlay module. The first controller of each terminal includes a processor for executing a selected application of the plurality and is responsive to the execution of an application program to generate the memory altering request and for actuating the communication system to transmit the generated request to the server station. The request identifies its terminal and the particular overlay module needed to continue the execution of its application program. The second controller of the server station is responsive to transmitted request for addressing and retrieving from its mass memory the particular overlay module, before actuating the communication system to transmit the particular overlay module back to the requesting terminal.

DESCRIPTION OF THE PREFERRED EMBODIMENT

Figure 1:
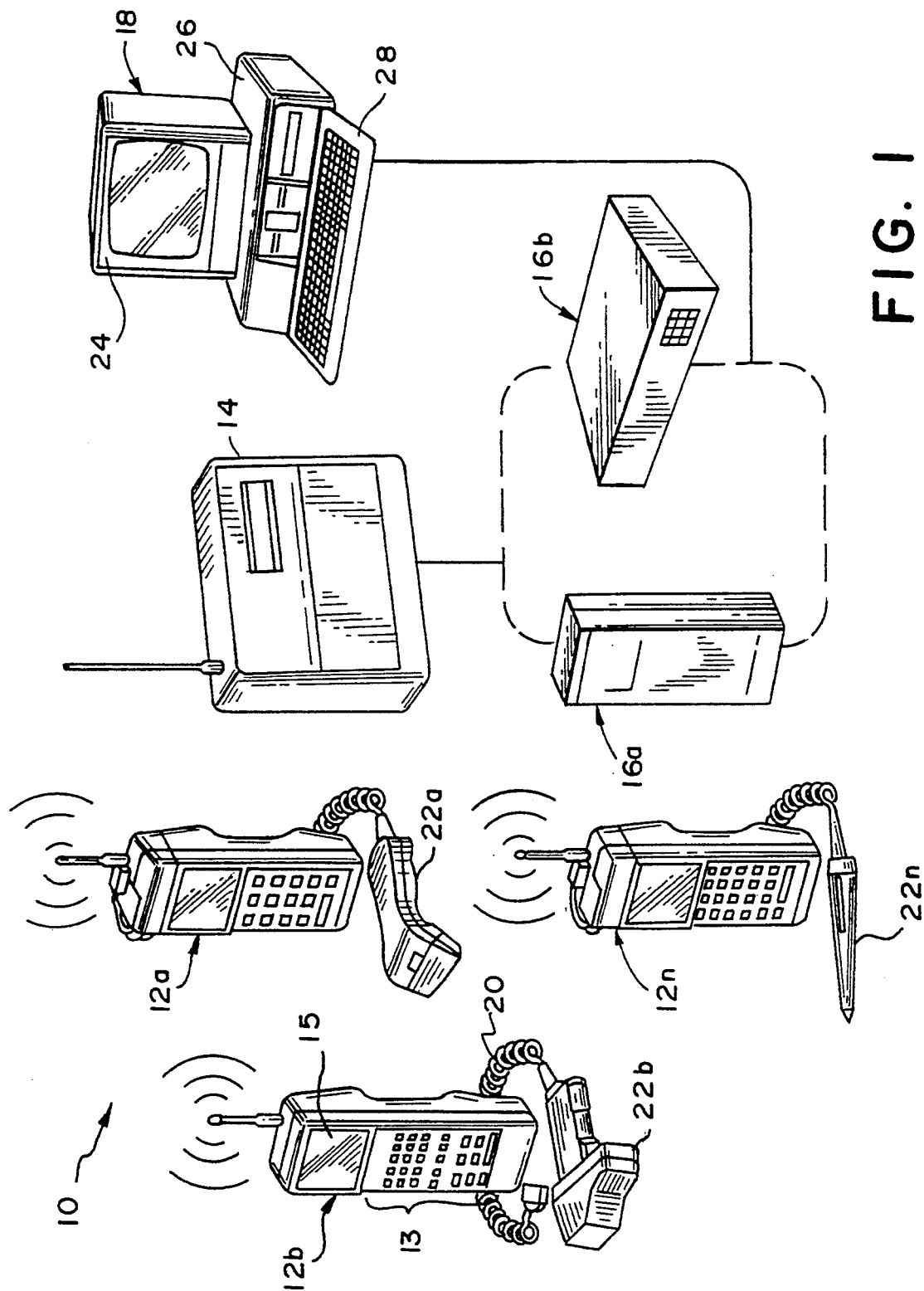
FIG. 1 is diagrammatic illustration of an existing prior art data capture system which may be upgraded to incorporate features of the present invention.
Figure 2:
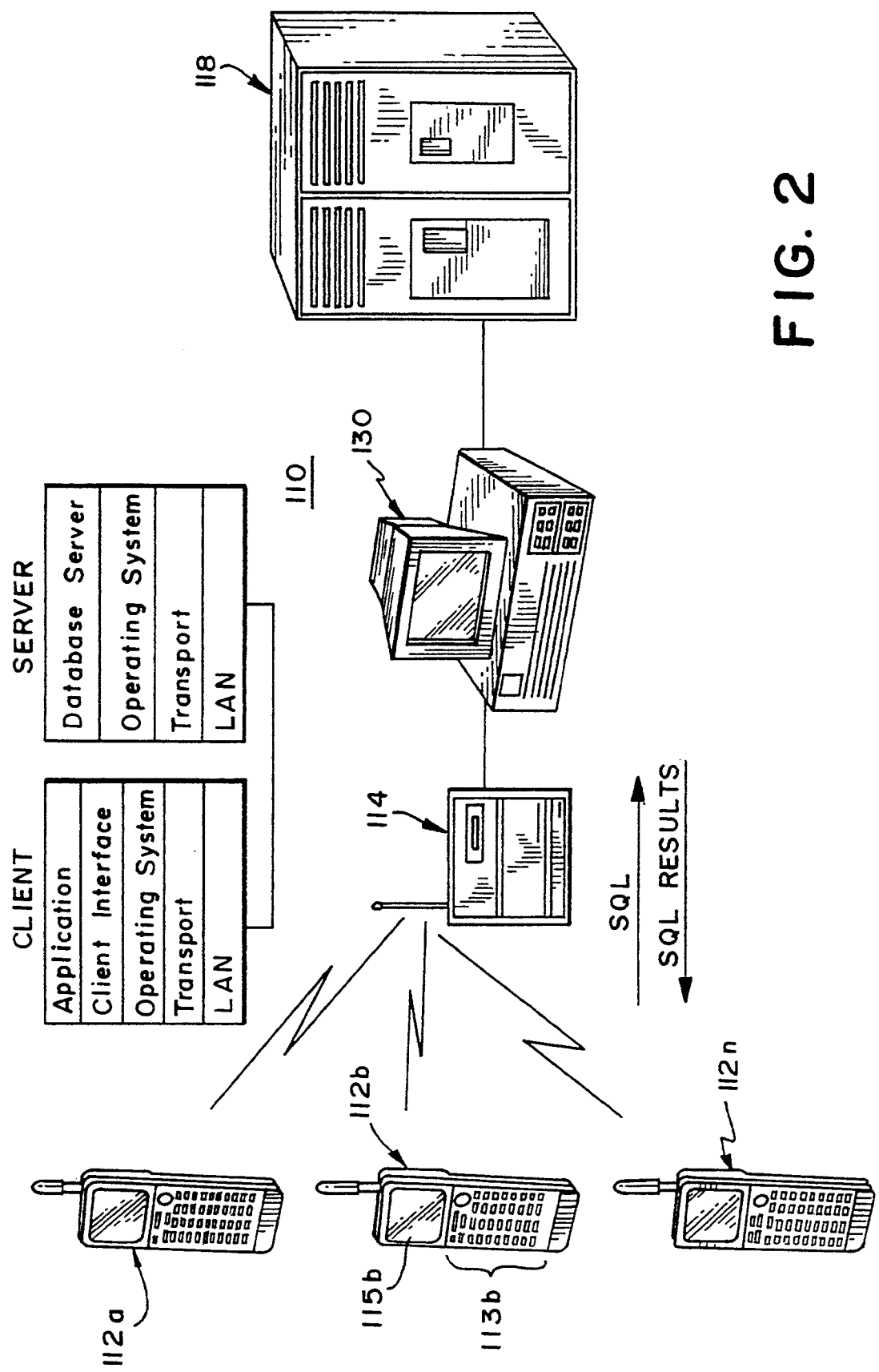
FIG. 2 is diagrammatic illustration of a data capture system configured in a client/server architecture to effect distributed processing in accordance with the teachings of this invention.
Figure 3:
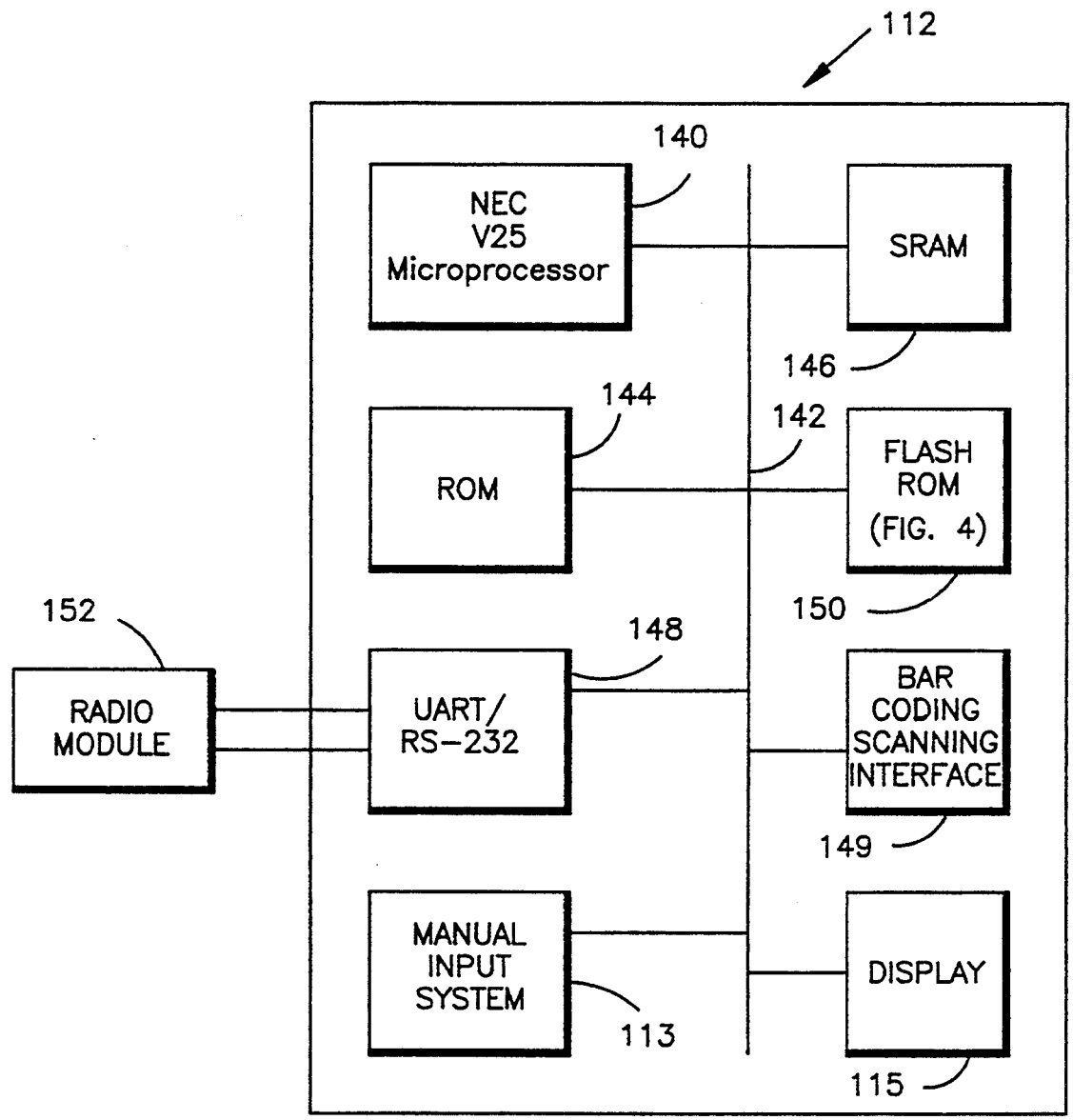
FIG. 3 is a functional block diagram illustrating the architecture of a portable data collection terminal as shown in FIG. 2.

Referring now to the drawings and, in particular to FIG. 2, there is shown a data capture system 110 in accordance with the teachings of this invention, where elements similar to those of FIG. 1 are identified by like numerals but in the 100's series. The data capture system 110 includes a plurality of portable data collection terminals 112a,b-n, which in an illustrative embodiment of this invention may take the form of that terminal RT1100 as manufactured by Norand Corporation. Each terminal 112 includes, as shown in FIG. 3, a radio module 152 which is capable of receiving and transmitting RF signals to a base radio transceiver 114, which may illustratively take the form of that model RB3000 base radio transceiver as manufactured by Norand Corporation. The RB3000 base radio transceiver 114 is capable of operating at multiple baud rates as described in U.S. Pat. No. 4,910,794. In turn, the received signals are transmitted to a database server 130, which in response to the received signals applies signals to the base radio transceiver 114 to be transmitted to a selected one of the plurality of the terminals 112. Each message transmitted between one of the terminals 112 and the transceiver 114 includes an identification number or ID indicating the originating terminal 112 or its user. In turn, the database server 130 is coupled to a host computer 118. In an illustrative embodiment of this invention, the host computer 118 may take the form of an IBM 3090 main frame with a DB2 database engine. As will be explained in detail below, each terminal 112 is programmed to compose an SQL request that will cause the database server 130 to return an application program, a memory overlay or application specific data to the requesting terminal 112. The host computer 118 may also access the database server 130 by generating and transmitting SQL request messages thereto.

Figure 7:
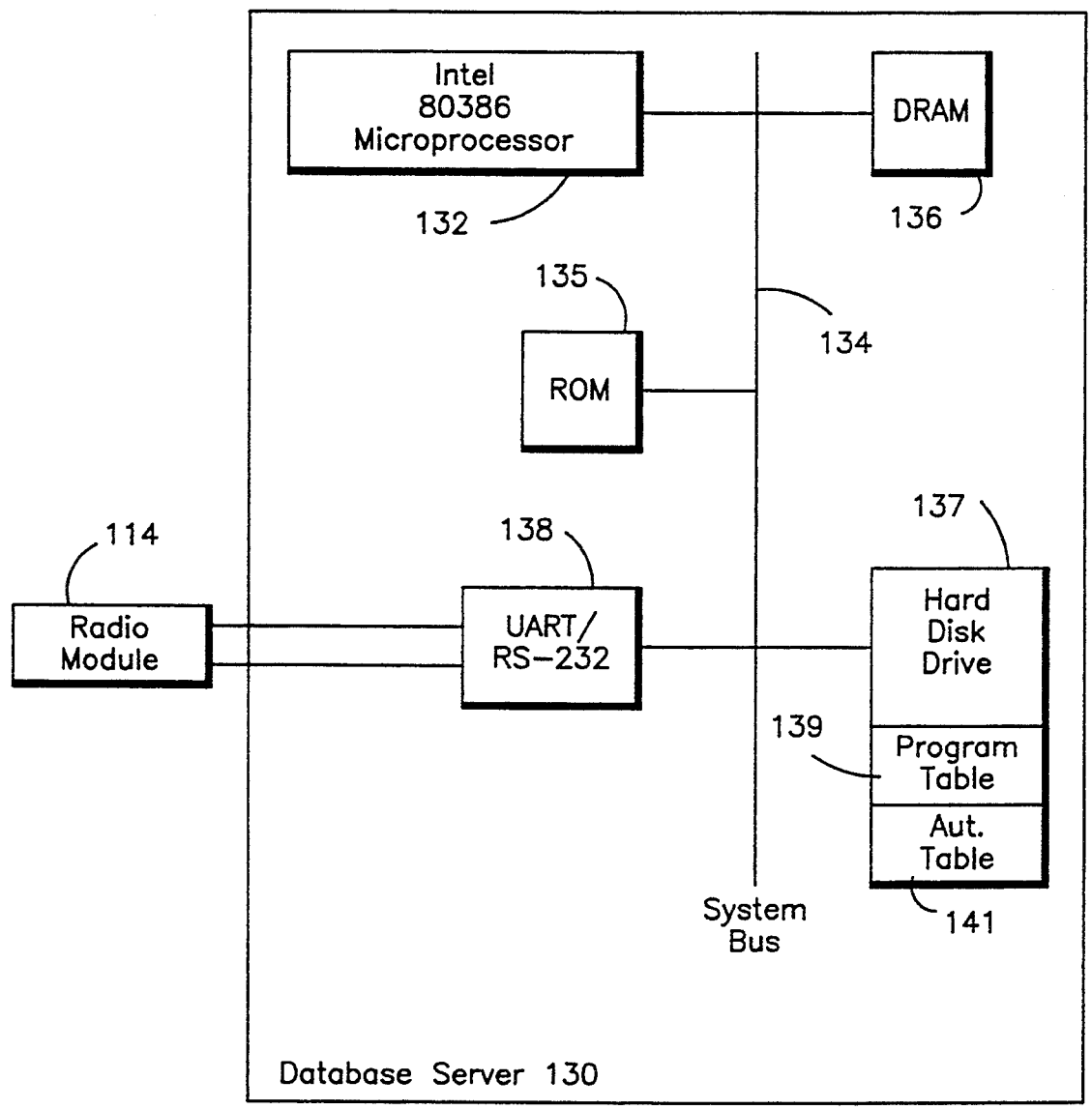
FIG. 7 is a functional block diagram of the database server shown in FIG. 2.

The host computer 118 has a database, which is accessible through the database server 130 to respond to the SQL request from one of the terminals 112, supplying to the requesting terminal 112 a computer program, memory overlays or application specific data. The host computer 118 may illustratively take the form of an IBM 3090 main frame with a DB2 database engine and would have a memory of a capacity many orders greater than that of the terminals 112. Much of the data and software to be used by the terminals 112 need not be stored with in the terminal's memory, but rather may reside in the database of the server 130 or in the memory of the host computer 118. Thus, when that data and/or program stored in the database server 130 is needed, the needing terminal 112 formulates its SQL request message, transmits that message via the base radio transceiver 14 to be processed by the database server 130, which accesses its database (or the memory of the host computer 118) and retransmits the requested data or programs back to the requesting terminal 112. At least two tables are defined as shown in FIG. 7 in a memory of the database server 130 including a first program table 139 and a second authorization table 141. The program table 139 keeps track of all of the programs, the overlays and the locations where they are stored in the database of the server 130. The programs are typically stored as a "bulk" or "binary" data type. The program table requires at a minimum the following fields or attributes:

| attribute | type | description |
| --- | --- | --- |
| program name | char | Name of the program |
| overlay | char | root or other named overlay |
| date | char or date | Date program was created (revision control) |
| program | varbinary or varchar | The actual program or overlay |
| size | integer | The size of the binary to be loaded |

As will be explained later with respect to FIG. 7, the first, program table 139 and the second authorization table 141 may be established within a hard disk drive 137 of the database server 130. The SQL request includes an attribute to identify whether a new program or an overlay is to be accessed and sent by the requesting terminal 112 and the address or name of the first, program table 139. The SQL request does not need to have the address of the requested program or overlay, but accesses the program table 139, which provides an address within the hard disk drive 137 in accordance with the attribute. As will be explained, the database server 130 in response to the SQL request accesses a particular program or overlay and transmits it back to the requesting terminal 112. The second authorization table 141 identifies the relationship between a particular user and each of the programs which that user is authorized to access. For example, each user has an ID and the authorization table 141 would list the program names which may be accessed by that particular user ID. Similarly, the SQL includes the ID and an address for the authorization table 141. Thus, the SQL request accesses the authorization table 141 to see if the requesting terminal 112 or its user as identified by the ID is permitted to use a particular program or overlay. If there is a match between the ID and one of the listed programs stored in the authorization table 141, then as will be explained, the database server 130 will access that program or overlay and transmit it back to the requesting terminal 112. On the other hand, if the ID is not found within the authorization table 141, the requested program or overlay is not transmitted back to the requesting terminal 112.

FIG. 3 shows an illustrative embodiment of the hardware architecture of the elements of the portable data collection terminals 112. Each terminal 112 includes a data bus 142 for interconnecting the elements of the terminal 112, which may include a ROM 144 for the bootstrap loader, a flash ROM 150 for storing system and application programs, a static RAM (SRAM) 146 for storing data, programs and dynamically loadable program overlays, a microprocessor 140 which may take the form of that processor made by NEC as a model V25, the radio module 152, a serial communication interface (UART) 148 for the radio module 152, a bar coding scanning interface 149, a manual input system such as a keyboard 113 and a display 115. The serial communication interface 148 permit messages to be transmitted and received via the radio module 152. The keyboard 113 and the bar code scanning interface 149 permit data entry respectively by the terminal user and a CCD bar code scanner similar to those identified in FIG. 1 by the numeral 22. As is well known in the art, a scanner 22 would be moved across coded data to provide data descriptive of the item to which the bar code was attached, typically including a description of the item, its price and/or other inventory data.

Appreciating that each terminal 112 is battery operated, a plurality of memories 144, 146 and 150 are provided therein to store various types and sizes of data and programs dependent upon their use and to the end, that battery drain be minimized. The ROM 144 stores the operating system and basic input/output system (BIOS) for the microprocessor 140. The SRAM 146 stores the dynamically loadable program overlays and data. The flash ROM 150 stores the system operating program and the application programs to be executed by the microprocessor 140, typically carrying out the various inventory functions for which a terminal 112 may be programmed. A portion of the SRAM 146 is partitioned into tables for application specific data, i.e., data to be used by the stored application programs. It is a significant aspect of this invention, that not all of the application programs or application specific data which may be used by a terminal 112, should be stored in the SRAM 146, but rather that significant portions of the application programs and specific data may be stored in the database server 130 (or even in the host computer 118) to be accessed when needed by a particular terminal 112.

Figure 4:
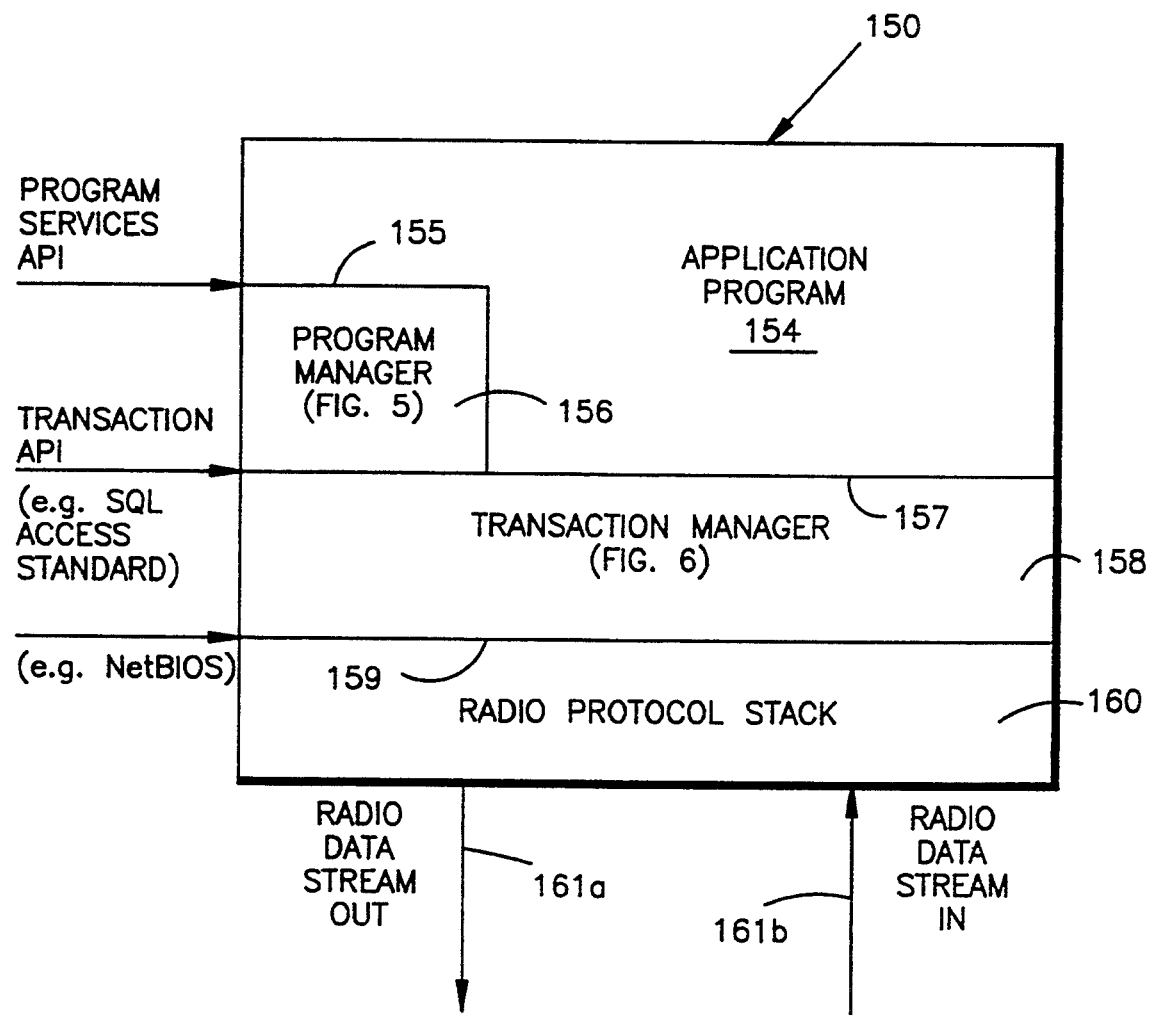
FIG. 4 is diagram of the application program architecture as stored within the ROM of the portable data collection terminal shown in FIG. 3.

The architecture of the software stored in the flash ROM 150 is shown in FIG. 4. The flash ROM 150 stores a plurality of application programs 154, e.g., inventory tracking, a program manager 156 program explained below with respect to FIG. 5 for transmitting the SQL request to the database server 130 to obtain an overlay module or a new program, a transaction manager 158 as explained below in detail with respect to FIG. 6 for opening a new session to receive or to transmit streams of data thereto, and a radio protocol stack 160 for effecting the RF transmission of a data stream out 161a to the database server 130 and for receiving an RF transmission via a data stream input 161b from the database server 130. An application interface 155 is established between the application programs 154 and the program manager 156, whereby any of the application programs can request the services of the program manager 156, which may be illustratively thought of as a collection of sub-routine calls for new overlay modules or a new program as will be explained below with respect to FIG. 5. Further, the application programs 154 have a transaction application programming interface (API) 157 with the transaction manager 158 as will be explained below with respect to FIG. 6. The transaction API 157 permits an application to transmit a SQL request to the database server 130. In turn, the transaction manager 158 has an interface 159 as exemplified by a NetBIOS with the radio protocol stack 160, which effects by RF transmission the sending and receiving of data to and from the database server 130. As indicated by the architecture of the data stored within the flash ROM 150 shown in FIG. 4, the radio protocol stack 160 is transparent with respect to an application program, i.e., the application program need not be programmed to effect radio transmission but only to place a call to transmit or to receive data. Either the program manager 156 or the transaction manager 158 carries out that step without any special program of the application programs 154.

The database server 130, as shown generally in FIG. 2, may illustratively take the form of an IBM PS/2 model 80 computer running IBM's OS/2 Extended Edition operating system. Generally, the database server 130 responds to a SQL request transmitted by a radio module 152 of a data collection terminal 112 (see FIG. 3), or from the host computer 118. The response of the database server 130 to the SQL request is determined by the semantics of that SQL request, which is formatted in the ANSI standard SQL. The database server 130 need not store state information about each of the terminals 112a,b-n. Data relating to a particular or specific terminal 112 is assigned to its own memory table, which may be illustratively formed at its unique address within a DRAM 136 of the database server 130 as shown in FIG. 7. That table for terminal specific data may be used at a buffer, where the addressed location within the DRAM 136 acts as a buffer memory to be addressed by a SQL request and in response thereto, to transmit the data stored in that buffer to the requesting terminal 112. Alternatively, the terminal specific data could be stored in the hard disk drive 137 of the database server 130 and could be accessed by assigning an identifier attribute for that data to each terminal 112, whereby the appropriate relation in the hard disk drive 137 of the database server 130 could be defined. As will be explained, each SQL request identifies a new program, an overlay or application specific data which is required by the requesting terminal 112; the database server 130 responds to that request and transmits in turn the requested program, memory overlay or application specific data to the particular requesting terminal 112.

FIG. 7 shows the hardware architecture of the database server 130, including a data bus 134 for connecting the various elements thereof, a microprocessor 132 illustratively taking the form of that processor manufactured by Intel under its model No. 80386, a ROM 135 for the computer powerup program, the diagnostic programs and the BIOS program, the dynamic RAM (DRAM) 136 serving as a memory for a database server program, server data, and a "cache" memory for the database, and a mass storage in the illustrative form of the hard disk drive 137 for storing all of the partitioned application programs and application specific data to be called by the plurality of terminals 112a,b-n. The database server 130 may provide gateway functions to other databases, e.g., DB2. In an operational sense, a gateway function permits access to a remote database by passing and/or reformatting the request. In other words, the SQL request could be translated into a format that would correspond and be recognized by that format of the remote database.

Referring now to FIG. 3, the SRAM 146 of a portable data collection terminal 112 is significantly smaller than the disk drive 137 of a database server 130 and may have a capacity insufficient to store all of an application program and data to be executed by its microprocessor 140. Distributed processing is accomplished in the context of this data capture system 110 employing a plurality of terminals 112 and a database server 130, by partitioning each application program into a plurality of parts or modules. The first program part is known as a root module and will be loaded first when a request for a new program is issued by the microprocessor 140 at power up or entered by a user through the terminal's key board 113. There will be at least one and typically many further parts known as memory overlays or overlay modules. The root module and the overlay modules will be given unique identifiers so that they may be loaded when requested. When the microprocessor 140 is executing the last instruction of a root module or an overlay module, then it is necessary to request and retrieve the next overlay module to permit the application program to continue to be executed without interruption. As will be explained below, this data capture system 110 is capable of formatting a SQL request for that original program or root module and for the subsequent overlay modules. In the simplest embodiment of this invention, the programmer builds into the application program a request to the program manager program 156 (see FIG. 4) to request and load an overlay module and jump to it. In a more sophisticated version, a program in the development environment determines the external function calls in program and substitutes a call to the program manager program 156. The development in partitioning of an application program is accomplished on the database server 130 using a data collection terminal emulator system that emulates the keyboard 113, the display 115 and other possible peripherals of the terminal 112. The only programming to be done specific to the database server 130 is to create the database tables and load them with any application specific data.

Figure 8:
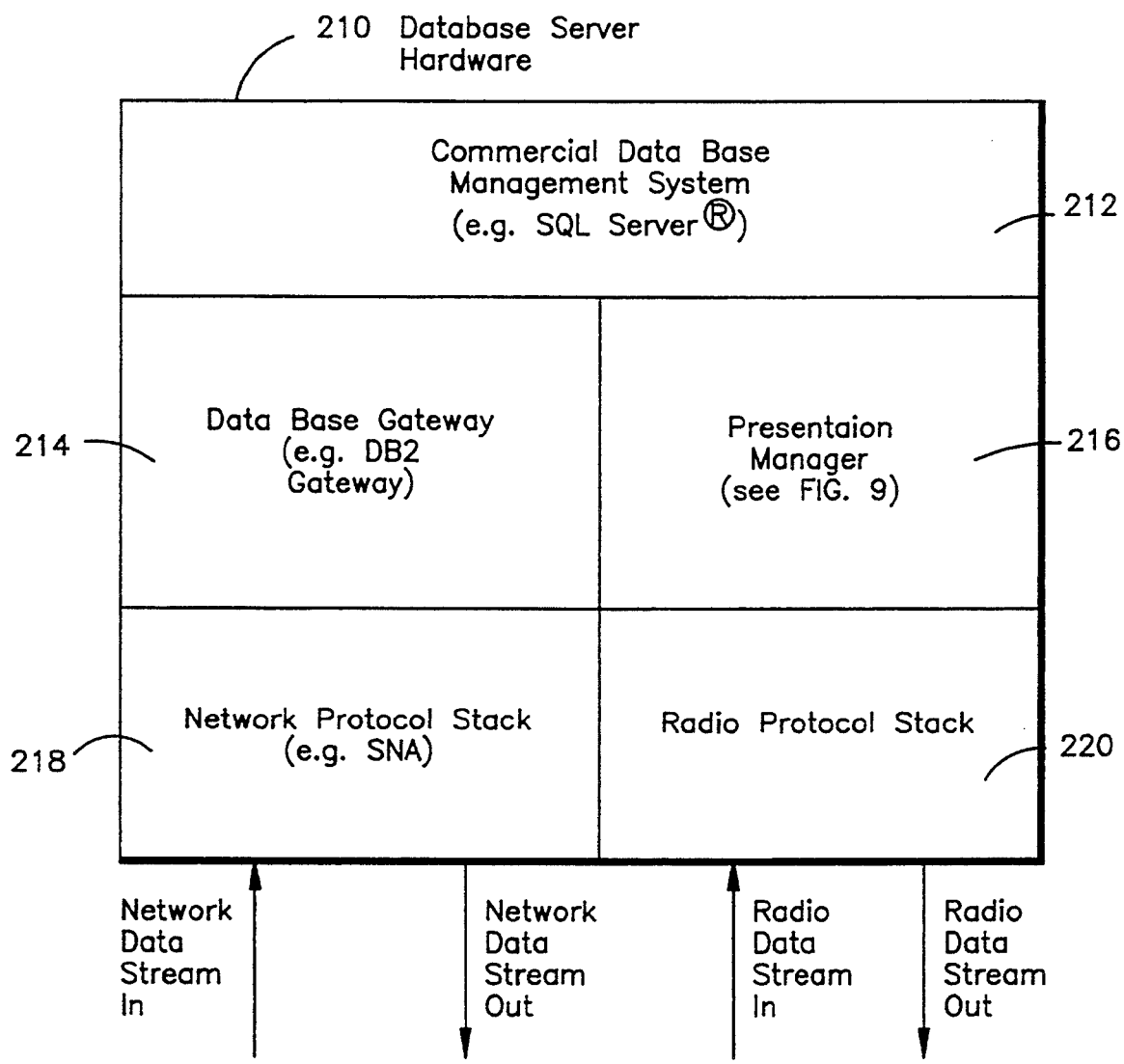
FIG. 8 is a diagrammatic showing of the architecture of the database server memory.
Figure 9:
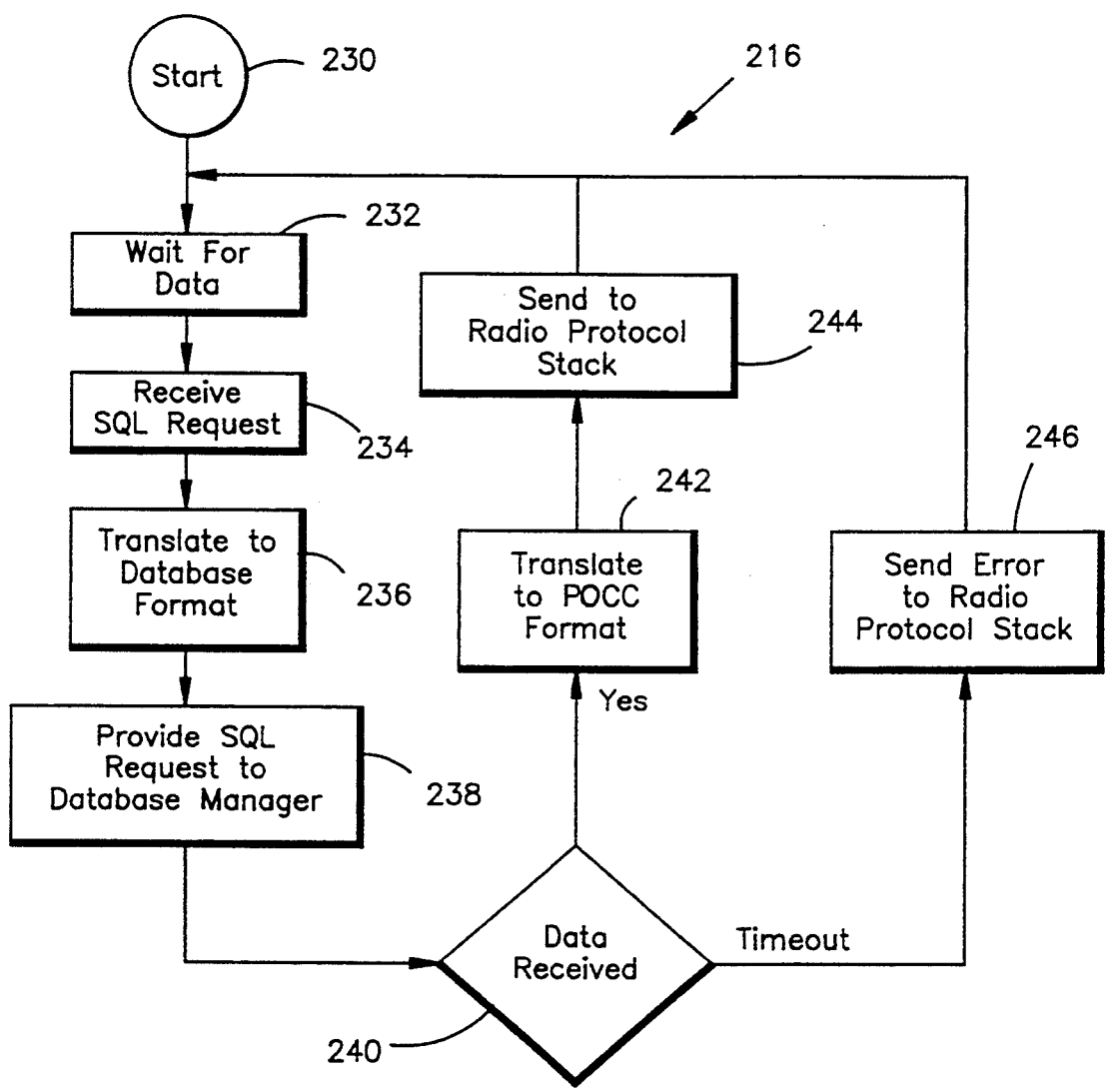
FIG. 9 is a flow diagram of the Presentation Manager program shown in the architecture diagram of FIG. 8.

The software architecture of the DRAM136 is further described in FIG. 8, as being partitioned to store a commercial database management system 212 such as the SQL Server (Microsoft), a database gateway 214, e.g., a DB2 Gateway by IBM, a presentation manager 216 to be more fully disclosed in the flow diagram of FIG. 9, a network protocol stack 218, and a radio protocol stack 220.

Figure 5:
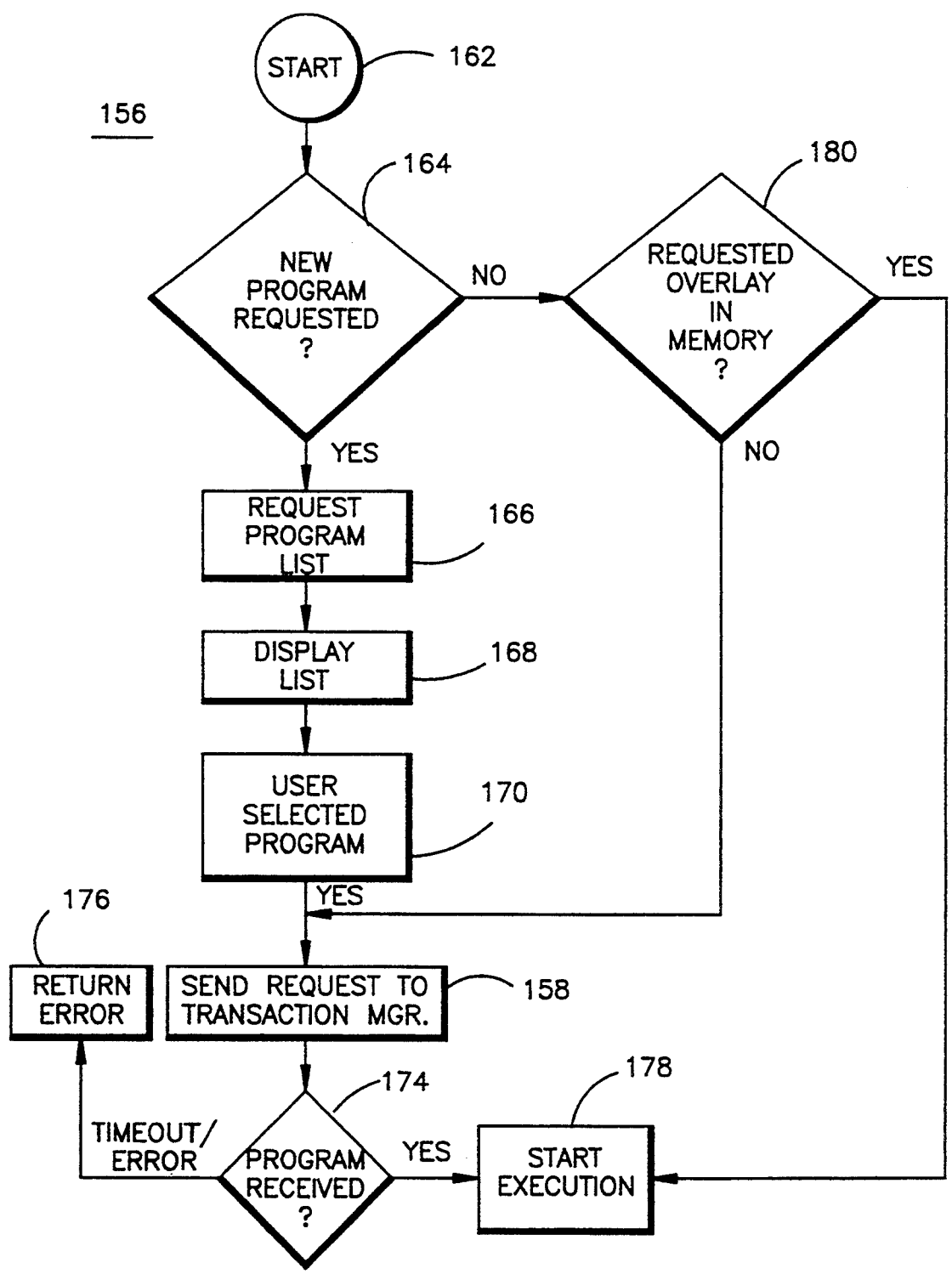
FIG. 5 is a flow diagram of the Program Manager program shown in the architecture diagram of FIG. 4.

The program manager program 156 generally shown in the software architecture diagram of FIG. 4 is more fully shown in the flow diagram of FIG. 5. Basically, the program manager program 156 is disposed in the next lower layer below an application program, e.g., an inventory program, and responds to its request for either a new program or a memory overlay, to configure and transmit an SQL request to the database server 130. Upon receipt of the requested program or memory overlay, the program manager program 156 stores it in SRAM 146 before initiating its execution by the microprocessor 140. A start 162 is initiated in a number of ways by the associated application program. At power up when typically there is no application being executed, the operating system program, which is stored in the ROM 144, places a call to the program manager 156. Alternatively, a new application program may be called by the operator by actuating a selected key(s) of the keyboard 113. Appreciating that all of a particular application program need not be stored in the SRAM 146, overlay modules of the application program presently being executed may be stored in the database of the server 130 and may be called by the program manager program 156. The application program continues to be executed until it recognizes that the next step is not available, at which time it places a call through the start step 162 for the next section or overlay module of the application program to be retrieved and placed in the SRAM 146 of the requesting terminal 112.

After a start has been provided in any of these ways, step 164 determines whether a new program or memory overlay is being requested. If a new program is requested, step 166 accesses the database in the server 130 for the requested program. In particular, step 166 initiates the radio protocol stack program 160, whereby the radio module 152 (see FIG. 3) is activated to transmit the SQL request to the database server 130 via the transceiver 114 (see FIG. 2). The SQL request initiated by step 166 seeks as will be described below a list of programs which are stored in the database server 130 and is available to this originating terminal 112. Initially, step 166 calls the radio protocol stack program 160 (see FIG. 4), whereby access is made through the UART 148 (see FIG. 3) to the module 152, turning module 152 "on" to transmit the SQL request to the transceiver 114. In addition to actuating the radio module 152, the radio protocol stack 160 provides the protocols and media access to allow the SQL request to be sent via the transceiver 114 to the database server 130. Illustratively, the radio protocol stack 160 would include the RTC system as described in U.S. Pat. No. 4,940,974. When the radio protocol stack 160 is called to initiate transmission, a session is said to be held between the requesting terminal 112 and the database server 130. For example, when a SQL request is generated by the transaction manager 158 (see FIG. 4), a session is opened. Each session enjoys a logical relationship between the requesting terminal 112 and the database, e.g., the hard disk drive 137, within the database server 130. Each session includes one or more data packets, the data packet being the maximum byte size of the data stream appearing on the output 161a that may be transmitted by the radio module 152. The radio protocol stack 160 functions to segregate a data stream out 161a to be transmitted to the database server 130, into a number of data packets and, in similar fashion, to reassemble the data packets of an incoming data stream appearing at the input 161b into a continuous data stream. Each SQL request includes an address or ID of its originating terminal 112. As will be explained later, the database server 130 uses a presentation manager program 216 to store the relationship (mapping) between the terminal ID and the operating system session identificer, which is stored in a known location within the DRAM 136 of the database server 130. In this way, the database server 130 remembers to which of the plurality of terminals 112a, b-n that the requested data or memory overlay, should be transmitted.

The database server 130 operating as will be explained, will respond to the SQL request for a program overlay by accessing a list of programs authorized for the particular requesting terminal 112 or user and transmitting that list back via the transceiver 114 to the requesting terminal 112. Illustratively, step 166 may format an SQL request in the following manner:

```
select distinct program_name from
authorization where user_id = "morrismd"
```

Here the SQL request is seeking a list of distinct programs, not duplicates, which have been authorized for transmission to a particular user, i.e., a particular terminal 112. In the illustrative request, the user ID is "morrismd"; in other words, all program names having an ID attribute "morrismd" are distributed to the requesting terminal 112. Next, step 168 displays the received list of authorized programs on the terminal's display 115.

In step 170 of FIG. 5, the terminal user selects from that list of available programs as displayed in step 168 and enters via the terminal keyboard 113 the selected program to be requested from the database of the server 130. When a program is selected from the menu displayed upon the display 115 (see FIG. 2) by user actuation of the keyboard 113, the transaction manager 158 (see FIG. 6) is called to format the SQL request to retrieve from the remote database the particular program selected in step 170. An illustratively example of such a SQL request may take the form of:

```
select program from program_table where
program_name = "inventory.exe" and overlay =
"root"
```

Illustratively, the SQL request accesses the first, program table 139 (see FIG. 7) to obtain the address in the hard disk drive 137 of the requested program, e.g. the "inventory.exe" program, which is an original program or its root overlay.

After transmission of the SQL request for a new program, step 174 waits for a returned message to the terminal 112 and will time out after a set period, e.g., 30 seconds. If no response is received by the requesting terminal 112 within this period, step 176 generates a return error message and returns it to the calling application program. On the other hand if the requested original program is received within the period, step 178 updates a mapping memory or table, which may be illustratively included within the SRAM 146 (see FIG. 3) of the terminal 112. A record of the application program or module thereof presently being executed by the microprocessor 140 is recorded in the mapping memory in terms of its starting address and length. When a new program is received and loaded into SRAM 146, step 178 records its starting address and length in the mapping memory, before loading the root module of the new program into a designated location of the SRAM 146 and, thereafter, initiates execution of the received and loaded program instead of returning control to the application program. The SRAM 146 is used as a "cache" memory to receive the 140 programs and memory overlays to be executed by the microprocessor 140. Thus, the SRAM 146 provides a local memory from which the application program may be executed, whereas the remaining sections or memory overlays of the application program and other original programs may be stored distantly in the database of the server 130.

It is appreciated that application programs are sometimes larger than its sections or memory overlays. Therefore to efficiently use the local memory, e.g., the SRAM146, new programs are illustratively stored in the database of the server 130, whereas program overlays may be stored in both the database of the server 130 and in the local memory, i.e., the SRAM 146. Therefore, if step 164 determines that the application is not requesting a new program, but rather an overlay module, step 180 examines the SRAM 146 and if the requested overlay module is in SRAM 146, the program moves to step 178 to initiate execution of the overlay module and control is passed to the overlay module. However, if the requested overlay module is not in the SRAM 146, step 180 moves control moves to the transaction manager 158, which formulates and transmits a SQL request via the transceiver 114 to retrieve the needed overlay module from the database of the server 130. The requested memory overlay is transmitted back via the transceiver 114 and is loaded into SRAM 146 and, thereafter, the local mapping memory in SRAM 146 is updated in terms of its starting address and length. After step 174 determines that the requested program has been timely received as explained above, step 178 initiates execution of the overlay module before returning control to the application program.

Figure 6:
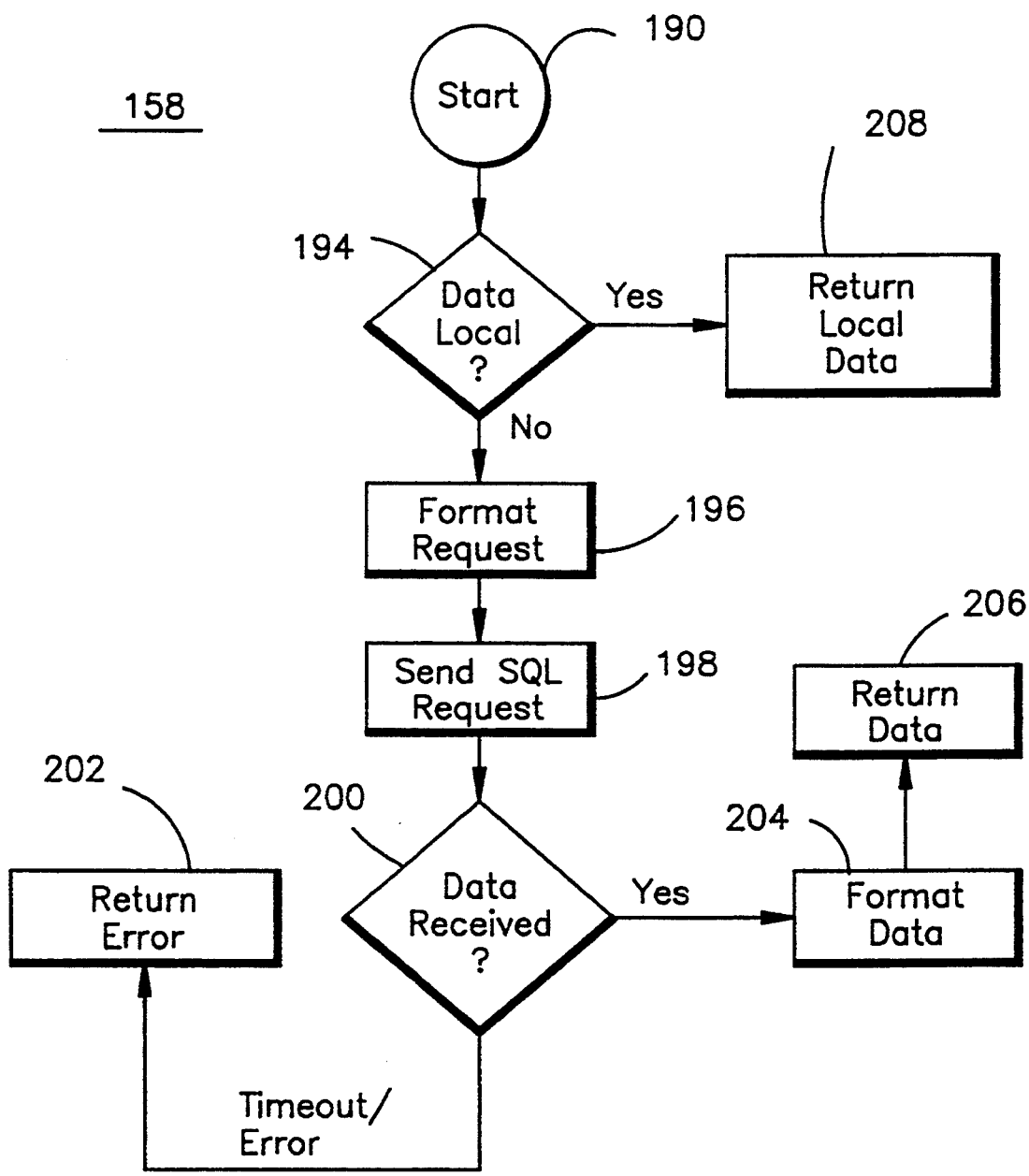
FIG. 6 is a flow diagram of the Transaction Manager program shown in the architecture diagram of FIG. 4.

Referring now to FIG. 6, there is shown the transaction manager program 158 which responds to a call from the application program 154 (see FIG. 4) for data to be processed thereby and provides an application programming interface (API) 157 to the application program which allows it to access the database in the server 130. The transaction manager program 158 also supports the program manager program 156 to access programs stored in the database of the server 130. Thus, it is seen that the program manager program 156 of FIG. 5 accesses remote programs and overlay modules whereas the transaction manager 158 of FIG. 6 accesses any kind of data. Initially, step 194 determines whether the requested data is in the local memory, i.e., SRAM 146, and, if so stored, step 208 returns the local data to be processed by the application program. If not, step 196 formats an SQL request for the requested data and step 198 calls the radio protocol stack program 160 (see FIG. 4) thus actuating the radio module 152 and transmitting the SQL request via the transceiver 114 to access the requested data in the database of the server 130. Step 200 waits while the server 130 accesses the requested data and transmits it via the transceiver 114 to the requesting terminal 112. Step 200 times a response period, e.g., 1 minute, and if that period is exceeded indicating an error condition, step 202 returns an error message to the calling application program. If the data is received within the response period, step 204 formats the requested data in a formusable by the calling application program, before step 206 returns that data to the application program. Step 206 returns the data to the SRAM 146, whereby control is passed to the application program which uses the returned data.

The presentation manager program 216, shown in FIG. 9, processes the SQL request transmitted from one of the terminals 112 (see FIG. 2) via the transceiver 114 and a standard interface, e.g. Unix sockets or IBM NetBIOS, to the database manager program 212 (see FIG. 8). The database manager program 212 interprets the SQL request and accesses the hard disk drive 137 accordingly (see FIG. 7). This allows an application program being executed by the microprocessor 140 (see FIG. 3) to establish sessions with any SQL accessible database as maybe formed within the hard disk drive 137 of the database server 130. The principle function of the presentation manager program 216 is to translate between that format used by the transaction manager program 158 of a terminal 112 and the SQL format of the database of the hard disk drive 137, if these formats are different. The SQL request to be applied to the database management program 212 is semantically configured in accordance with the function to be achieved. The SQL request may direct that data be inserted into the disk drive 137, that data be accessed and retrieved, that a new program or overlay module be retrieved from the disk drive 137, that data be added to one or more fields in a set of records stored in the disk drive 137 or that data be deleted from one or more records of the disk drive 137. Updating involves the transmitting of new variable values from the originating terminal 112.

Referring now to the flow diagram of FIG. 9, the presentation manager program 216 enters through start step 230 to step 232, which waits for a SQL request to be forwarded from the radio protocol stack 220 (see FIG. 8). As will be described below, the SQL request is directed toward the database manager program 212. Step 234 receives the SQL request as a sequence of bytes. Step 236 comes into play only if some reformulation of the SQL request is necessary. In a first instance, if the database manager program 212 was not adapted to support the ANSI standard SQL format or if the SQL request was compressed, then step 236 would be necessary to decompress the data or to translate the format of the SQL request into that of the particular database manager program 212 employed in the system. Next, step 236 provides the data to the database manager program 212 through an interface in the illustrative form of the IBM NetBIOS interface. The translation step 236 is identical to the formatting request 196 of the transaction manager program 158 of FIG. 6 and, ordinarily, it would be only necessary to perform the formatting or translation step once upon a particular SQL request, preferably in the presentation manager program 216. Step 240 waits for the database manager program 212 to access the disk drive 137 for a predetermined time period. If the requested material, i.e., the application specific data, root overlay or memory overlay, is received within the time period, it is translated in step 242 to the format of the requesting terminal 112, before calling the radio protocol stack program 220 to transmit the accessed material back to the requesting terminal 112. On the other hand, if the SQL request is one to add or delete data from the hard disk drive 137, step 240 generates a status message indicating that the change of the hard disk drive 137 has been completed, before step 242 translates that status message into the terminal format and the radio protocol stack 220 is called in step 244 to send that message back to the requesting terminal 112. If the time period set in step 240 times out, without receiving the requested material, step 246 transmits an error pachet to the radio protocol stack program 220, whereby an error message is returned to the requesting terminal 112.

Thus, there has been described a data capture system 110 that distributes the application program between the memory of a terminal 112 and a database server 130 serving a plurality of such terminals 112. In this fashion, the complexity of the program to be executed upon a terminal 112 is minimized by permitting the data base server 130 and its hard disk 137 to store a large variety of application programs to be served to its client terminals 112. The above data capture system 110 permits dynamic loading of the original programs or root modules and subsequent memory overlays from the hard disk 137, whereby the size of the SRAM 146 of a terminal 112 and the power required by a terminal 112 is minimized. Further, the amount of data transmitted via the RF link between each of the plurality of terminals 112 and the database server 130 is minimized. Further, the database server 130 provides a "user friendly" environment for the development of application programs for the terminals 112. In particular, the database server 130 is capable of readily developing both the client and server portions of the application programs to be executed by the terminal's microprocessor 140.

It will be apparent that many modifications and variations may be effected without departing from the scope of the teachings and concepts of the present disclosure.

We claim:

1. A data capture system comprising:
   a) a plurality of portable client data collection terminals, each terminal comprising means for collecting data, dynamic addressable storage means and first control means operating on data formatted in a first style;
   b) a server station comprising mass memory means which is larger than said dynamic addressable storage means of a terminal for storing data to be used by said data collection terminals, means responsive to a memory altering request for addressing said mass memory means and second control means operating on data formatted in a second style different from said first style, said data stored in said mass memory means being formatted in said second style; and
   c) communication means for interconnecting said server station and each of said plurality of client data collection terminals;
   d) said first control means of each client data collection terminal comprising means responsive to a need for further data for generating said memory altering request and for actuating said communication means to transmit said generated request to said server station, said generated request identifying its terminal and the particular needed data;
   e) said responsive means of said server station responsive to said generated and transmitted request for addressing and retrieving said needed data from said mass memory means before actuating said communication means to transmit said needed data back to said requesting terminal as identified by said request;
   f) said communication means comprises RF radio means for transmitting said memory altering request from each of said plurality of client data collection terminals to said server station and for transmitting said needed data from said server station back to said requesting terminal.

2. The data capture system as claimed in claim 1, wherein said RF radio means comprises a first radio module disposed in each of said plurality of client data collection terminals and a second radio module disposed in said server station.

3. The data capture system as claimed in claim 2, wherein said generating means of each terminal initially responds to a need for further data by accessing its dynamic addressable storage means for the needed data and, if not available therein, for then actuating its radio module to transmit said generated request to said server station.

4. The data capture system as claimed in claim 2, wherein each of said plurality of client data collection terminals comprises battery means for energizing its terminal, whereby said terminals are rendered portable.

5. The data capture system as claimed in claim 1, wherein said generating means initially responds to a need for further data by accessing its dynamic addressable storage means for the needed data and, if the needed data is not available therein, for then actuating said communication means to transmit said generated request to said server station.

6. The data capture system as claimed in claim 1, wherein said generating means generates said memory altering request in said first style, said second control means of said server station comprising means for translating said memory altering request from its first style to said second style.

7. The data capture system as claimed in claim 6, wherein there is included means coupled to said mass memory means of said server station for receiving and translating said needed data from its second style to its first style before actuating said communication means to transmit said translated, needed data back to said requesting terminal.

8. A data capture system comprising:
   a) a plurality of client data collection terminals, each terminal comprising means for collecting data, first control means including processor means for executing a selected one of a plurality application programs, and dynamic addressable storage means;
   b) a server station comprising mass memory means which is larger than said dynamic storage means of a terminal for storing application programs to be executed by said processor means of each of said data collection terminals, each application program being partitioned into a root module and at least one overlay module, and second control means responsive to a memory altering request for addressing said mass memory means; and
   c) communication means for transmitting data between said server station and each of said plurality of client data collection terminals;
   d) said first control means of each client data collection terminal further comprises means responsive to the execution of an application program by said terminal's processor means for generating a memory altering request and for actuating said communication means to transmit said generated request to said server station, said generated request identifying its terminal and a particular overlay module needed to continue the execution of its application program;
   e) said second control means of said server station responsive to said generated and transmitted request for addressing and retrieving from said mass memory means said particular overlay module, before actuating said communication means to transmit said particular overlay module back to said requesting terminal as identified by said request, whereby said processor means of said requesting terminal is able to continue executing said presently executed application program.

9. The data capture system as claimed in claim 8, wherein each of said plurality of application programs is formatted in a first style.

10. The data capture system as claimed in claim 9, wherein said second control means of said database server comprises a second processor for executing its control program, said control program of said database server formatted in a second style differing from said first style, said plurality of application programs stored in said mass memory means also being formatted in said second style.

11. The data capture system as claimed in claim 10, wherein said generating means of each terminal generates its memory altering request in said first style, and said second control means of said server station further comprises first means for translating said memory altering request from its first style to said second style.

12. The data capture system as claimed in claim 11, wherein said second control means of said server station further comprises second means for translating said addressed overlay module from its second style to said first style and, thereafter, actuating said communication means to transmit said translated overlay module to said requesting terminal.

13. The data capture system as claimed in claim 8, wherein each root module and said one overlay module of an application program is programmed with a call for the next overlay module needed to continue the execution of its application program, said processor means of a terminal executing a root module or said one overlay module to generate said call, said generating means of a terminal responsive to said generated call for generating said memory altering request identifying the next overlay module to be executed by said processor means of a terminal.

14. The data capture system as claimed in claim 13, wherein said generating means is responsive to said call for said next overlay module for addressing said dynamic addressable storage means, if said addressed next overlay module is present therein, said processor means executing said next overlay module, and if not present therein, actuating said communication means to transmit said memory altering request to said server station.

15. The data capture system as claimed in claim 14, wherein said root module and said one overlay module of each application program is programmed with calls for data needed in the execution of its application program, said generating means comprises means responsive to each of said data calls for initially addressing said dynamic addressable storage means, if said needed data is present therein, retrieving the needed data from said dynamic addressable storage means to be then processed by said executed application program, and if the needed data is not present in said dynamic addressable storage means, actuating said communication means to transmit said memory altering request from that terminal to said server station.

16. The data capture system as claimed in claim 13, wherein each of said plurality of client data collection terminal comprises battery means for energizing and rendering its terminal portable, said generating means responsive to said overlay call for the next overlay module for addressing said dynamic addressable storage means, if said next overlay module is present therein, said processor means executing said next overlay module, and if said next overlay module is not present in said dynamic addressable storage means, actuating said communication means to transmit said memory altering request to said server station, whereby the time that said communication means is energized and the drain on said battery means are minimized.

17. The data capture system as claimed in claim 16, wherein said root module and said one overlay module are programmed with calls for data needed to be executed by their application program, said generating means comprising means responsive to said data calls for addressing said dynamic addressable storage means, if said needed data is present within said dynamic addressable storage means, retrieving and immediately processing said requested data by said application program, and if said requested data is not present, actuating said communication means for transmitting said memory altering request to said server station, whereby the time that said communication means is actuated and the drain on said battery means are minimized.

18. The data capture system as claimed in claim 8, wherein said communication means comprises RF radio means for transmitting said memory altering request from each of said plurality of client data collecting terminals to said server station and for transmitting said retrieved, particular overlay module from said server station to said requesting terminal.

19. The data capture system as claimed in claim 18, wherein said RF radio means comprises a first radio module disposed in each of said plurality of client data collection terminals, and a second radio module in said server station.

20. The data capture system as claimed in claim 8, wherein each of said plurality of client data collection terminal comprises battery means for energizing its terminal, whereby said terminal is portable.

21. A data capture system comprising:
a) a plurality of battery operated data collection terminals, each terminal comprising means for collecting data including a keyboard, processor means for executing a selected one of a plurality of application programs, dynamic addressable storage means, and first radio means for transmitting and receiving radio signals; and
b) a server station comprising mass memory means which is larger than said dynamic addressable storage means of a terminal for storing said plurality of application programs to be executed by said processor means of each of said data collection terminals, each application program being partitioned into a root module and at least one overlay module, means responsive to a memory altering request for addressing said mass memory means, and second radio means for transmitting and receiving radio signals to and from said first radio means of a terminal;
c) each data collection terminal further comprising means responsive to calls originating during the execution of an application program by said processor means for data specific to said executed application program or for the next overlay module or to a call entered by a user on said keyboard for a root module of a new application program, for generating a corresponding memory altering request and for actuating said first radio means to transmit said generated request to said server station, said generated request identifying its terminal and the particular application specific data, root module or overlay module needed to continue the execution of its application program;
d) said responsive means of said server station responsive to said generated and transmitted request for addressing and retrieving from said mass memory means said particular root module, overlay module or application specific data, before actuating said second radio means to transmit same back to said requesting terminal as identified by said request.

22. The data capture system as claimed in claim 21, wherein each of said plurality of application programs is formatted in a first style.

23. The data capture system as claimed in claim 22, wherein said plurality of application programs stored in said mass memory means are formatted in a second style differing from said first style.

24. The data capture system as claimed in claim 23, wherein said generating means of each terminal generates its memory altering request in said first style, and said server station further comprises first means for translating said memory altering request from said first style to said second style.

25. A data capture system as claimed in claim 24, wherein said server station comprises second means for translating said addressed overlay module from said second style to said first style and means for actuating said second radio means to transmit said translated overlay module to said requesting terminal.

26. The data capture system as claimed in claim 21, wherein said server station comprises a first memory program table for storing unique addresses for each of said plurality of application programs, said generating means of a data collection terminal generating said memory altering request transmitted to said first memory program table, said request including said address of said first memory program table.

27. The data capture system as claimed in claim 26, wherein each of said plurality of data collection terminals has a unique ID, said server station further comprises a second memory table for storing for each application program a list of terminal ID's to be given access to a particular application program, said server station comprising means responsive to each memory altering request for comparing said ID of said request with said list of ID's for said requested application program and, only if there is a match, retrieving said requested application program from said mass memory means to be transmitted back to said authorized requesting terminal.

* * * * *